June 5, 1923.

A. E. SILANDER 1,457,398

BRUSH MAKING MACHINE

Filed July 25, 1921

Inventor:

Arthur Efraim Silander.

Patented June 5, 1923.

1,457,398

UNITED STATES PATENT OFFICE.

ARTHUR EFRAIM SILANDER, OF BERLIN, GERMANY.

BRUSH-MAKING MACHINE.

Application filed July 25, 1921. Serial No. 487,481.

*To all whom it may concern:*

Be it known that I, ARTHUR EFRAIM SILANDER, a citizen of the Republic of Finland, residing at Berlin, Germany, have invented certain new and useful Improvements Relating to Brush-Making Machines (for which I have filed applications in Germany March 30, 1920, and Finland Dec. 20, 1920), and of which the following is a specification.

The present invention relates to a brush and like making machine of the kind in which a reciprocating table is used for moving the brush stocks or a template under an oscillating bristle distributor, means being provided for varying the altitude of the table relative to the distributor.

The object of the invention is to ensure a perfect adjustment of the table, it being necessary that it should remain parallel with the bristle distributor in whatever altitude it is placed, and the invention consists in supporting the table on a runway adapted to be adjusted by means of screw spindles and nuts which latter are operated in unison by worm wheels for effecting the adjustment. The table, moreover, is adapted to slide on runners so that a perfectly straight movement is ensured.

Figure 1:
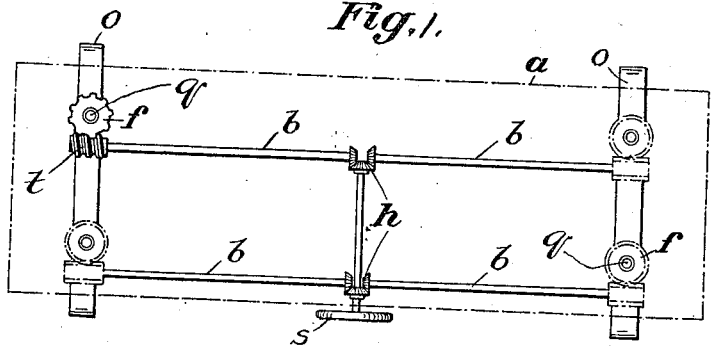
Figure 2:
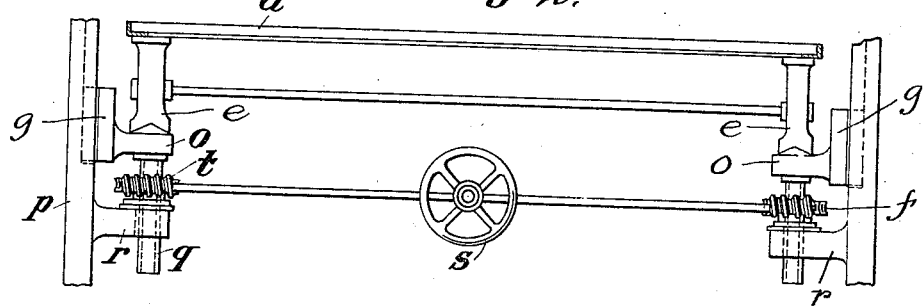

Fig. 1 of the drawings represents a diagram of the gears, and Fig. 2, is a front elevation of the complete device.

The brush stock or a template is supported in a frame $a$ which is itself supported on a runway $o$ by means of runners $e$ so that it can be reciprocated thereon under the bristle distributor. The runway or runways $o$ are connected to slides $g$ by means of which they are guided in vertical grooves in the machine frame $p$ so that the frame $a$ can be held parallel with the bristle distributor and so that its altitude can be varied relative to the same. For this purpose the runways are supported by screw spindles $q$ and by nuts $f$ on rigid brackets $r$ secured to the machine frame. The nuts $f$ consist of worm wheels which are engaged by worms $t$ connected to shafts $b$. There are four sets of shafts and spindles, and they are all operated by a common regulating shaft through the medium of a hand wheel $s$ and bevel gears $h$. Thus all the nuts will move in unison so as to maintain the frame parallel to the bristle distributor in all positions of vertical adjustment.

I claim:—

A reciprocating table for brush and like making machines, comprising a frame, slidable runners connected to said frame, runways supporting the frame by means of the runners, vertically guided slides holding the runways, supporting brackets, screw spindles guided in said brackets and connected to said slides, nuts arranged on said spindles so as to support the slides on the brackets, and means for operating said nuts in unison so as to vary the altitude of the frame relative to the brackets while maintaining it parallel to its original plane.

ARTHUR EFRAIM SILANDER.